(12) United States Patent  (10) Patent No.: US 8,894,852 B2
Urban  (45) Date of Patent: Nov. 25, 2014

(54) MACHINE TOOL COOLANT RECONDITIONING SYSTEM

(75) Inventor: Keith Urban, Waterford, MI (US)

(73) Assignee: JK Industries, LLC, Warren, MI (US)

( * ) Notice: Subject to any disclaimer, the term of this patent is extended or adjusted under 35 U.S.C. 154(b) by 449 days.

(21) Appl. No.: 13/360,193

(22) Filed: Jan. 27, 2012

(65) Prior Publication Data

US 2013/0193049 A1    Aug. 1, 2013

(51) Int. Cl.
*B01D 35/18*    (2006.01)

(52) U.S. Cl.
USPC ..... 210/181; 210/195.1; 210/196; 210/198.1; 210/220; 210/167.02; 210/167.06

(58) Field of Classification Search
USPC .................. 210/181, 195.1, 196, 198.1, 220, 210/167.02, 167.06
See application file for complete search history.

(56) References Cited

U.S. PATENT DOCUMENTS

| | | | |
|---|---|---|---|
| 3,618,707 A * | 11/1971 | Sluhan | 184/109 |
| 4,655,940 A | 4/1987 | Harms | |
| 4,865,724 A * | 9/1989 | Brandt et al. | 210/104 |
| 5,224,051 A * | 6/1993 | Johnson | 700/169 |
| 5,244,586 A | 9/1993 | Hawkins et al. | |
| 5,399,262 A | 3/1995 | Hawkins et al. | |
| 5,582,740 A | 12/1996 | McEwen et al. | |
| 5,599,457 A | 2/1997 | Fanning et al. | |
| 5,738,782 A | 4/1998 | Schafer et al. | |
| 5,948,274 A | 9/1999 | Lyon et al. | |
| 6,004,470 A | 12/1999 | Abril | |
| 6,027,658 A | 2/2000 | Soble et al. | |
| 6,322,694 B1 * | 11/2001 | Iliadis et al. | 210/167.01 |
| 6,616,835 B2 | 9/2003 | Jensen | |
| 7,140,468 B2 | 11/2006 | Rake et al. | |
| 7,338,606 B2 | 3/2008 | Bratten | |
| 7,410,569 B1 | 8/2008 | Tilev et al. | |
| 7,611,624 B2 | 11/2009 | Perry et al. | |
| 2008/0283475 A1 | 11/2008 | Benty et al. | |
| 2008/0295540 A1 * | 12/2008 | Kunz et al. | 62/475 |
| 2009/0139935 A1 | 6/2009 | Matousek et al. | |
| 2009/0218300 A1 | 9/2009 | Essemiani et al. | |
| 2013/0193049 A1 * | 8/2013 | Urban | 210/181 |

* cited by examiner

*Primary Examiner* — Chester Barry
(74) *Attorney, Agent, or Firm* — Gifford, Krass, Sprinkle, Anderson & Citkowski, P.C.; Douglas J. McEvoy

(57) ABSTRACT

A system for producing and supplying a coolant to a filtration sub-system, and for reconditioning and recombining a return flow of used coolant. A main reservoir is in two way communication with the filtration sub-system via a clean coolant outlet and a dirty coolant return. An inlet feeds an untreated water supply to a de-ionization canister. A mixing valve in communication with the inlet recombines a remaining untreated portion of the water supply with the de-ionized portion. A mixing pump intermixes the water supply with a chemical concentrate to produce a coolant delivered to a main reservoir. A volume of coolant is drawn through an outlet from the reservoir and communicates the coolant to a particle filter, a chiller, and prior to outputting to the filtration sub-systems. The used return coolant is filtered and reintroduced to the main reservoir.

11 Claims, 10 Drawing Sheets

MACHINE TOOL COOLANT RECONDITIONING SYSTEM

FIELD OF THE INVENTION

The present invention discloses a central mix and makeup system for supplying a water/oil coolant mixture to a plurality of individual metal working machine coolant filtration systems, the system including reconditioning and replenishing features for treating a return/used coolant flow from the individual filtration systems for recirculation in a continuous and substantially closed loop cycle.

BACKGROUND OF THE INVENTION

Coolant filtration systems, such as associated with metal working machines, are well known in the art and which operate under the principle of successively filtering particles, shavings and other debris from a fluid coolant, such as further mainly consisting of some level of a treated water medium within which is dissolved a minor percentage of a natural or synthetic oil. Given the nature of the associated metal working machines, such as which can include conveyed removal of coolant immersed parts, it is found that significant percentages of the water content of the coolant (such as up to 50% within a 20-24 hour period) are evaporated.

Absent proper tracking and control, an overly oil rich coolant mixture (such as resulting from iterative addition of volumes of replenishment coolant exhibiting the initially fixed percentage of water to oil and which can exceed an arbitrarily desired range of 6-10% or higher oil emulsified within a water base) can result in significant greater expense and associated waste, and along with deleterious effect to coolant performance. Degradation of performance can further result from reverse emulsion of coolant into the water base (e.g. reduction or loss of immiscibility of the oil within the water with concurrent loss of effective surface area of contact within a machine cutting zone). It is further found that excessive oil to water percentage in the coolant further degrades associated coefficient of drag within the cutting zone.

Additional references are known which associate a central coolant reservoir with one or more machine located coolant filtration systems, these including such as the metalworking fluid central system of Johnson, U.S. Pat. No. 5,224,051, the central coolant system of Harms, U.S. Pat. No. 4,655,940, the coolant re-circulating arrangement and method of Bratten, U.S. Pat. No. 7,338,606 and the machine tool coolant filtration system of McEwan, U.S. Pat. No. 5,582,740.

SUMMARY OF THE INVENTION

The present invention discloses an improved system, method and associated computer writeable medium for integrating a central mix and makeup (CMM) tank into a fluid coolant recirculation network communicating with any number or configuration of individual metalworking machine located coolant filtration systems, this for pre-treating and conditioning an initial volume of an inlet water supply, in combination with a calibrated type and sub-volume of oil being inter-mixed with the water for delivery as a coolant to any number of the individual machine filtration systems. The CMM system and method additionally provides for return coolant reconditioning (such as to remove residual tramp oil and various micron sized solids and particulates not separated by the filtration system), as well as for adjusting the relative percentages of oil to water in the replenishment volumes of coolant (typically reducing the oil component in a progressive fashion) prior to adding into a main holding reservoir associated with the CMM tank and the returned volumes of pre-circulated coolant, this again accounting for a rate of evaporation of water not limited to time based upon a variety of ambient conditions and machine setups and in order to avoid degradation of the coolant into an overly oil rich mixture.

Most broadly, the present invention discloses a system for producing and supplying a coolant to at least one filtration sub-system, as well as reconditioning and recombining a return flow of used coolant. A body incorporates a main reservoir in two way communication with the filtration sub-system via an outlet clean coolant carrying conduit and a dirty return coolant carrying conduit.

An inlet conduit includes a branching location for feeding a portion of an untreated water supply to such as a de-ionization canister, as well as a reverse osmosis system or other supply of low TDS (total dissolved solids) water with a mixing valve in communication with the inlet conduit recombining a remaining untreated portion of the water supply with the de-ionized portion, such as according to at least one variable programmed into a processor associated with the system such as a conductivity probe that sends an electronic signal to the PLC processor which adjusts the mixing valve to raise or lower the TDS level so that the actual reading as indicated by this probe matches the set point as defined by the operator in the PLC processor. A mixing pump is in fluidic communication with an outlet of the mixing valve and intermixes the recombined water supply with a chemical concentrate, an output of which chemically represents the coolant.

A reservoir associated with the body receives a volume of coolant to a fill level established by high and low parameters. A pump draws a volume of coolant through an outlet extending from the reservoir and communicates the coolant to a particle filter.

A chiller located downstream from the particular filter adjusts a temperature of the coolant, an outlet of the chiller communicating with the outlet clean coolant carrying conduit. After machine located filtration, the dirty coolant is carried by the return conduit and delivered to a re-introduction location within the main body and which includes a waste oil skimmer and a coalescent filter for removing residual oil. A fluid column within the body communicates the coalescent filter with a reintroduction location of the main reservoir for resupplying reconditioned coolant for recirculation to the filtration subsystems.

Additional features associated with the system include the provision of an ozone generator and controller or air pump and diffuser for introducing a plurality of ozone or oxygen particles within a submerged location of the main reservoir. A first branch line extends from an outlet of the particle filter prior to the chiller and returns a subset volume of clean coolant to the main reservoir via a series of nozzles arranged proximate a submerged floor of said reservoir. In operation, this serves to introduce a laminar agitated flow of clean coolant for preventing residual solids within the reservoir from settling and to maintain a constant thermal gradient and homogeneous coolant concentration along the substantial depth of the reservoir.

A second overflow line extends from an outlet location of the chiller for redirect back to the main reservoir a determined volume of clean coolant outflow determined to exceed a downstream demand represented by a total number of filtration subsystems in operation. A dirty fluid outlet from the particle filter communicates to a drain, in which is located a sump which can further be actuated in order to push a volume of dirty fluid through a filter and into the main body reintroduction location associated with the main reservoir for recirculation of the return coolant through the coalescent filter.

The associated processor control controls at least one additional operational parameter associated with the system including any one or more of the coolant concentrate mixing pump, inlet feed valve, ozone generator, main pump, chiller, first branch line and second overflow line. A transducer is incorporated into the man tank such as in communication with the sight gauge and converts pressure readings, such as measured by determinable ranges such as 4-20 mA (milli Amps) or 0-10 VDC (volts DC) as a convertible signal for determining a liquid level in the main reservoir. Additional mechanical valves are provided as a backup and include a pair of high and low float mechanical switches mounted within the main reservoir establishing emergency high and low parameters, and for activating and deactivating the inlet feed valve on an emergency basis. A manual bypass valve is further provided in parallel with the inlet feed valve and which can be accessed during off line servicing, manual fill/makeup of water, or testing of the system.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

The present invention discloses a central mix and makeup system for supplying a water/oil coolant mixture to a plurality of individual metal working machine coolant filtration systems, the system including reconditioning and replenishing features for treating a return/used coolant flow from the individual filtration systems, combined with the ability to continuously recalibrate a recipe mixture of replenishment volumes of coolant, for recirculation in a continuous and substantially closed loop cycle.

Prior to embarking on a detailed description of the system, method and computer writeable medium, a brief explanation of the factors associated with establishing an optimal coolant according to one non-limiting example include the desire to establish specific parameters for sustaining long term coolant effectiveness. These include each of 1) limiting the incidence of suspended solids to less than 50 ppm (parts per million) at 40 micron size or larger, 2) limiting the incidence of tramp oil in the coolant to less than 20 ppm, 3) reducing bacterial (oxygenated) content within the coolant to under 10,000 cycles, and 4) reducing dissolved solids to under 200 ppm total (90-180 being objectively considered to be an optimal range but not limiting in any instance).

Figure 1A:
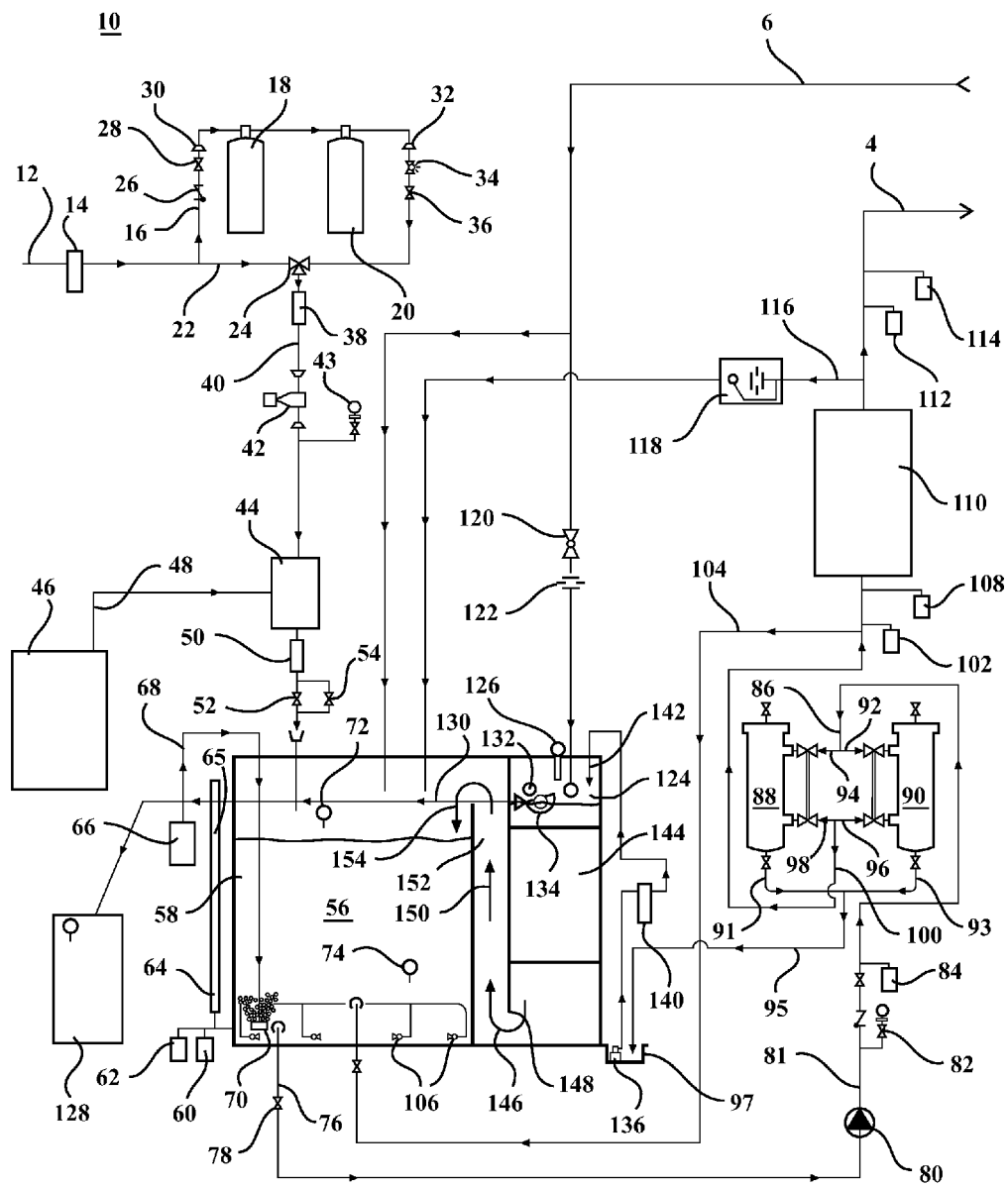
FIG. 1A is a schematic of the central mix and makeup (CMM) system depicting the central coolant reservoir combined with the aspects of initial water de-ionization and oil addition, combined with succeeding pre treatment steps associated with introduction into the reservoir along with post machine return flow/reconditioning for discharging waste/solids and for continually updating a desired water/oil recipe for substantially closed loop recirculation.
Figure 1B:
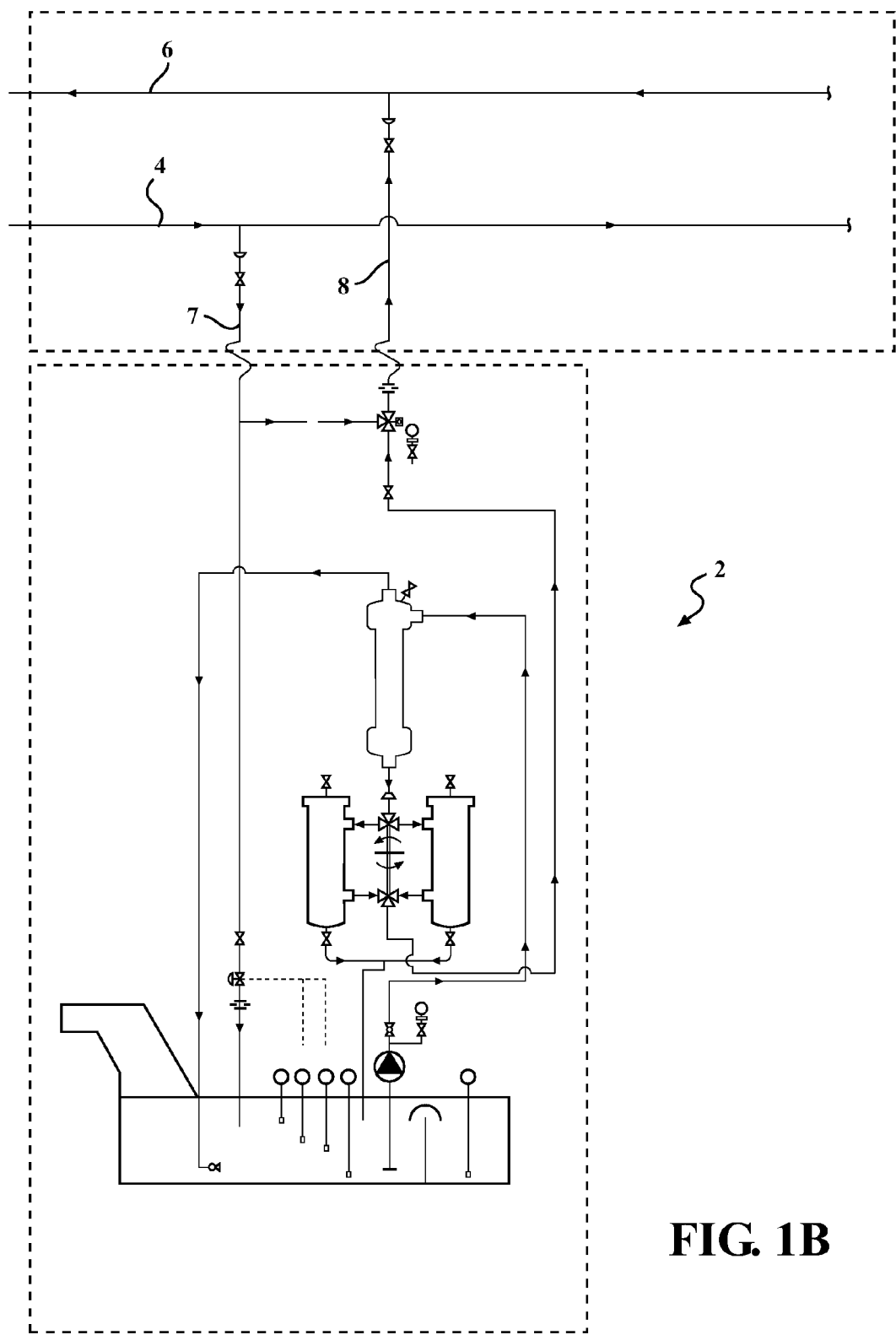
FIG. 1B is a schematic of a selected machine located coolant filtration system in operative fluid communication with the CMM system depicted in FIG. 1A.

Ideally, steps 1) and 4) are accomplished at the individual filtration system, generally depicted at 2 in FIG. 1B, and which depicts one non-limiting example of a suitable multi-stage filtration protocol for successively removing smaller and smaller ranges of micron sized particulates. The filtration system 2 is intended to denote a general representation of any suitable type such as is associated with a metalworking/workpiece shaping equipment for the purpose of assisting in the removal of workpiece shavings, debris and the like.

The CMM system, process or computer writeable/assisted medium of the present invention generally depicted at 10 in FIG. 1A further contemplates being communicated, via fluid outlet 4 and return 6 lines to any plurality of individual machine located filtration systems (in the example of FIG. 1B the selected filtration system 2 including an inlet feed line 7 communication with the CMM outlet line 4 and a corresponding outlet line 8 communicating with the CMM return line 6. Without further elaboration, it is generally noted that the filtration system of FIG. 1B denotes a multi (5) stage particulate filtration protocol and which is referenced as being representative of any potential type of filtration system, assembly or protocol with which the CMM system, process and process driven computer writable/assisted medium may be integrated, again for the purpose of assisting in maintaining long term sustained coolant integrity, combined with ensuring that a desired oil/water coolant mixture is maintained by adjusting the mixture of replenishment volumes of coolant in response to water evaporation at the individual filtration systems.

Referencing again the overall schematic of FIG. 1A, an untreated (typically city water) inlet fluid line is referenced at 12 and which admits a usually freshwater (typically well or city water) supply exhibiting any collection of entrained solids or other particulates, ph levels, bacteria, ionization or the like. The fluid line 12 communicates through an in-line sediment filter 14 which captures any larger sized clumps of particulate (such as without limitation being 30 micron sized or above).

Downstream from the in-line filter 4, the fluid line 12 branches into a first line 16 successively feeding to a pair of de-ionization canisters 18 and 20, as well as alternately reverse osmosis or other supply source for low TDS quality water. Said canisters 18 and 20 are in combination with a separate branching line 22, which in turn communicates to first and second inlets of an auto three way valve 24. The first branching line 16 can include a series of flow regulating components including a check valve 26, other gate/ball/globe or other valve 28, and/or a type of flow modifying orifice 30, such as is shown prior to entering the one or more de-ionization canisters 18 and 20. The canisters operate under the principal of chemical exchange within a mixed bed of positively and negatively charged (cation/anion) resins and are instructed by a processor control associated with the auto three way valve 24, following an analysis of the quality and content of the inlet water 12 in order to determine the relevant percentages of untreated and deionized water to combine for communication through the valve 24 common output.

Figure 6:
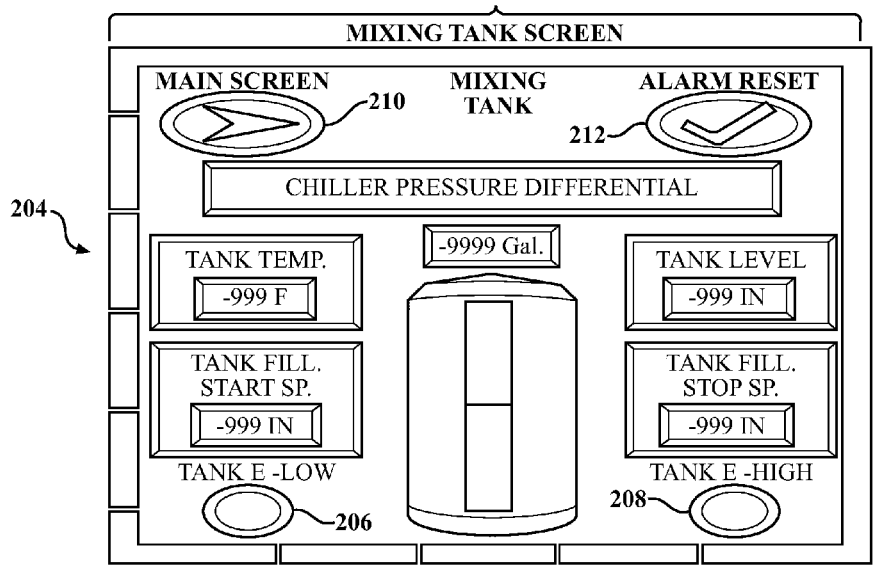
FIG. 6 is a mixing tank status and adjustment screen for determining a proper fill level of the CMM reservoir.
Figure 7:
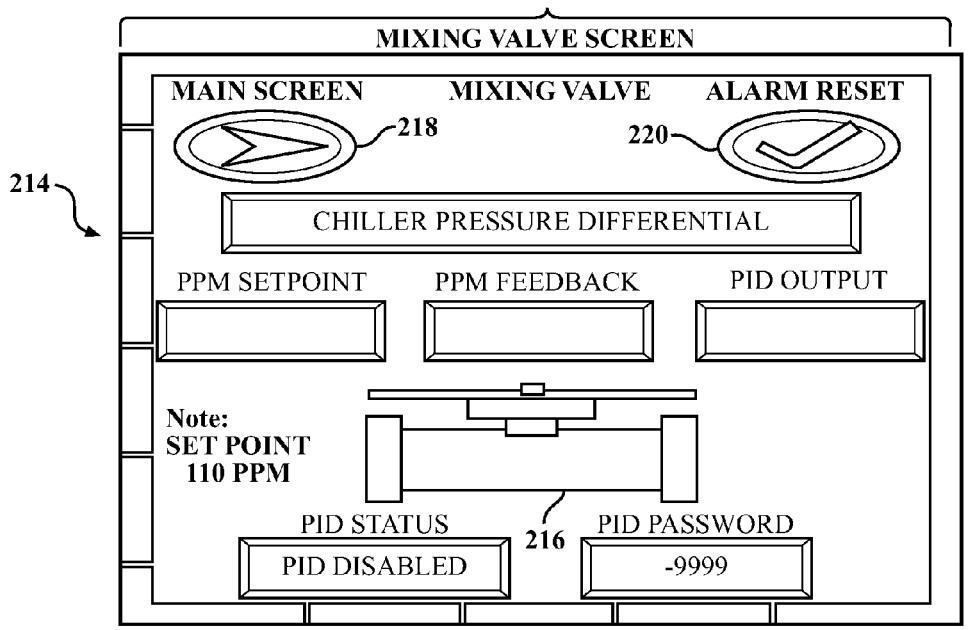
FIG. 7 is a mixing valve screen for controlling the operation of the three way feed water controller valve in which first and second inlets recombine a volume of an untreated inlet water with a determined subset volume of pre de-ionized water, this admixture outputted for subsequent admixture with an oil.

Following the last de-ionization canister, the branching line 16 can incorporate a further flow modifying orifice 32, a subsequent conductivity light 34 (this being a visual warning to change out the de-ionization canisters) and a further inline valve 36, following which the branching line 16 enters the first designated inlet of valve 24 combined with a subset volume of otherwise untreated (post inline filter 14) city or well water being admitted through a separate inlet. The auto three way (or proportional) valve 24 is also termed a feed water controller and, with reference to the succeeding control screens of FIGS. 6 and 7, is operable for adjusting the relative percentages of untreated inlet feed water sub-volume with de-ionized water sub-volume, this in order to adjust (typically reduce) an amount of dissolved solids contained within the water supply within a desired ppm (parts per million) range by volume and conductivity. One non-limiting example of a desired outlet (makeup) feed water supply from the valve 24 can include a 4-20 mA rating with a range of 90-180 ppm dissolved solids, the particular desired parameters of the pre-conditioned water supply (including both initial reservoir and makeup volumes) being adjustable based upon both the nature of the raw inlet feed water and the type of machine filtration processing with which the eventual coolant recipe is to be supplied.

Following being outputted from the proportional valve 24, the combined fluid is passed through an inline static mixer 38 integrated into an associated outlet line 40 and, following that, passing through an in-line mounted probe 42 which samples the fluid mixture in order to confirm a desired range of dissolved solids and, when necessary, instructs the controller as to adjustments to the motorized components within the auto three way valve 24 in order to guarantee an acceptable mixture. A pressure gauge 43 and associated valving is provided in a line extending from a downstream location of the line 40 from the probe 42 and for confirming a desired feed pressure.

A coolant concentrate mixing pump 44 is located downstream of the probe 42 and draws in and introduces a suitable chemical concentrate from a drum or other volume holding container 46, via an interconnected feed line 48 into a collective outlet 49. The chemical concentrate typically includes any type of natural and/or synthetic oil which is admixed with the pre-treated water and so that a desired coolant concentration is achieved. As described previously, and depending upon the nature and application of the downstream located filtration systems, such a recipe mixture can include an oil admixture of 0-12% per volume in comparison to the water base within which it is admixed, with the further understanding that the replenishment volumes of water passing through the mixing pump 44 may exhibit reduced oil components to compensate for water evaporation occurring at the filtration systems, and again in order to avoid an overly rich sump or oil concentration within the coolant over time.

A further in-line static mixer 50 is located beyond an outlet of the coolant concentrate mixing pump 44 along merged line 49 and for optimizing intermixing of the oil and water components and, following that, both an auto feed valve 52 and optional manual bypass valve 54 are provided in parallel for introducing the mixed coolant into a main fluid holding reservoir 56 associated with a three dimensional body 58. Tank valve readings are provided by a pressure transducer (such as forming a portion of the sight gauge assembly identified below at 64 and which operates by reading a fluid level 65 of the sight gauge corresponding to an overall height of the main reservoir 56. The pressure reading taken is then converted to an output reading in a defined range, such as including but not limited to 4-20 mA or 0-10 VDC signal, this corresponding to a determined tank fluid level and, depending upon the parameters programmed into the system, results in the selective activation or deactivation of the associated feed valve. Backup Pressure and temperature switches are referenced at 60 and 62, respectively, in communication with the fluid column site gauge containing a sub-volume of coolant consistent with a fluid level 64 of the main reservoir 56, with the switches operable to determine emergency high/low fluid conditions. Either the pressure transducer or the mechanical floats work with an associated controller program (the functionality and subroutines of which will be subsequently described in further detail) for sampling both temperature and pressure readings within the main tank (the latter calculating fluid level 64 by comparing the fluid pressure at the sampled depth with a processor accessible lookup table which may again be calibrated to any determined range of mA or VDC, and in order to readily determine the actual fluid level within the main reservoir 56 and, in response to that, to actuate the auto feed valve 52 in order to refill the reservoir to a desired level). Without further elaboration, the bypass valve 54 allows for operator intervention to manually fill the reservoir or, more typically, to allow for fluid flow during maintenance/testing or the like.

Additional treatment of the CMM main reservoir 56 includes the introduction of ozone or air from a generator/controller 66 via a feed line 68 extending to a generally floor located introduction point 70 at which the introduced ozone (via well known laws of molecular science) reduces the bacterial activity within the water to within the desired range. Also shown are high 72 and low 74 float switches within the reservoir 56 and which can cooperate with the processor driven protocol for activating the emergency high flow level indicators.

An outlet line 76 is shown extending from the reservoir body 58 and represents an out-feed of coolant for subsequent delivery to the various remote filtration systems 2. A valve 78 is disposed within the line 76 and which successively extends to a main operating pump 80 (see also associated processor schematic of FIG. 4 as will be subsequently described) to which is communicated a generally warm water supply drawn from the main reservoir 56.

The pump 80 is located in line 76 and pushes the coolant through an outlet 81 to a series arranged succession of a mechanical pressure gauge 82 with shutoff capability and a corresponding automatic pressure switch 84, following which the fluid line communicates, at inlet end 86 with a parallel arrangement of sentinel filters 88 and 90, via inlet locations 92 and 94, outlet locations 96 and 98, and combined out-feed 100. Separate valve controlled drain fluid outlets from the sentinel filters 88 and 90 are indicated at 91 and 93 and which combine into line 95 for communicating the drain outlet to drain into sump 97.

As is further depicted, a series of valves are located at both inlet and outlet locations and serve to allow for access to the filters, singularly or in tandem, to replace when dirty. Indication of a dirty filter can be readily determined by comparison of a reading of a downstream pressure gauge 102 with the pre-inlet gauge 84, the disparity between these correlating to a level of debris/particle entrapment existing within the filters 88 and 90 and, when achieving a certain set parameter which may or may not be dictated by the associated processor control, instructing when the filters require replacement.

In practice, the sentinel filters 88 and 90 largely overlap the functionality of the machine located filtration system 2 in the removal of stray particulates, organic matter and the like. Prior to the outlet side pressure switch 102, a branch line 104 extends from the outlet 100 in order to return to the main CMM reservoir body 58 a subset volume of coolant. As further shown, this is represented by a series of nozzles 106 proximate the submerged floor of the reservoir and which serve to introduce a laminar agitated flow of clean coolant for preventing residual solids within the reservoir from settling at the bottom, as well as to maintain a constant thermal gradient and homogeneous coolant concentration along the substantial depth of the reservoir (i.e. to prevent temperature stratification).

A major component of the clean coolant outputted from the sentinel filters 88 and 90 proceeds through a temperature switch 108 and, based on the reading of the outlet coolant temperature, selectively activates a downstream chiller 110 in order to adjust the coolant temperature to a desired reading (such as without limitation within a general range of 80° F.). Readings from a further pair of pressure 112 and temperatures 114 switches incorporated within outlet line 4 previously identified and which extends from the chiller 110 compare with those of the inlet side pressure and temperature switches 102 and 108, this in order to instruct the processor control to selectively activate and deactivate the chiller 110. Without limitation, desired parameters associated with the chiller outlet include such as a 3-10° F. drop in temperature with no more than 10 psi pressure loss, combined with establishing an output volume to the filtrations subsystems which equal to or greater than a collective return flow.

A further overflow branching line 116 extends from a location of the chiller outlet line 4 and serves to redirect back to the CMM main reservoir 56, a determined volume of coolant outflow which is determined to exceed the collective determined downstream demand represented by the total number of filtration systems 2 in operation. A constant pressure valve 118 is incorporated into the overflow line 116 and ensures that a proper return flow of clean coolant is resupplied to the CMM tank in the instance of reduced demand.

Clean coolant proceeding along the outlet line 4 beyond the branching line 116 and the outlet located pressure 112 and temperature switches 114 is then communicated to the various remote filtration systems 2 such as previously described in principle and, following the individual (typically multistage) filtration protocols, is returned via collective line 6 which includes an isolation (shutoff) valve 120 and succeeding orifice 122. The fluid return line 6 continues and terminates at a reintroduction location 124 associated with a coalescing dirty tank portion of the main CMM body 58. The fluid return line 6 may further split flow between the main tank 56 and the coalescing side reservoir (see coalescing filter subsequently identified at 144).

A foam sensor 126 is located at the reintroduction location 124 and determines a level of surface oil/foam present within the return coolant reservoir, with an excessive level being indicative of an overfilling of a run off waste drum 128 which is fed by outlet line 130 communicating through a concentrate (tramp) oil decant line shutoff 132 fed by a waste oil skimmer 134. In such an instance, the sensor 126 instructs the closing of the drain shutoff 132 to prevent such overfilling. An external sump is also provided to transfer batch amounts of coolant (e.g. decanted from chip totes, etc.) back into the main coolant reservoir via sump line 138, filter 140 and tank reintroduction location 142.

At this point, the return flow 6, alone or in combination with the recirculating flow 142 and less the waste foam/oil discharged through the skimmer 134 and drain 132, is subsequently immerse filtered through a coalescent filter stack 144 in order to separate any additional tramp oils. The coalescent filter in one non-limiting application includes a volume of plasticized spheres or the like which, by virtue of their physical properties, attract the residual oil to their surfaces.

In this fashion, the fluid flow (see arrow 146) is communicated in succeeding downward and upward directions in which the flow reduces velocity as it rounds a bottom disposed corner 148 and travels in an upward direction 150 along an isolated column location 152 of the CMM body 58, prior to be discharged in spill-over fashion at an upper end location 154 into the main reservoir 56. The coolant at the main reservoir re-introduction location 154 is substantially free of solids and tramp oil and associated level of oxygenation. At this stage, the continuous cycle repeats with the main pump 80 withdrawing coolant from the main reservoir through outlet line 75 and with the processor control aspects selectively activating/deactivating the valve 52 to further replenish reservoir 56 (such as via the pressure level sensor transducer previously described) based upon the demand loads experienced and resulting again from factors such as the number of filtration systems 2 on line and the associated evaporation level of the water component of the mixed coolant.

Figure 1C:
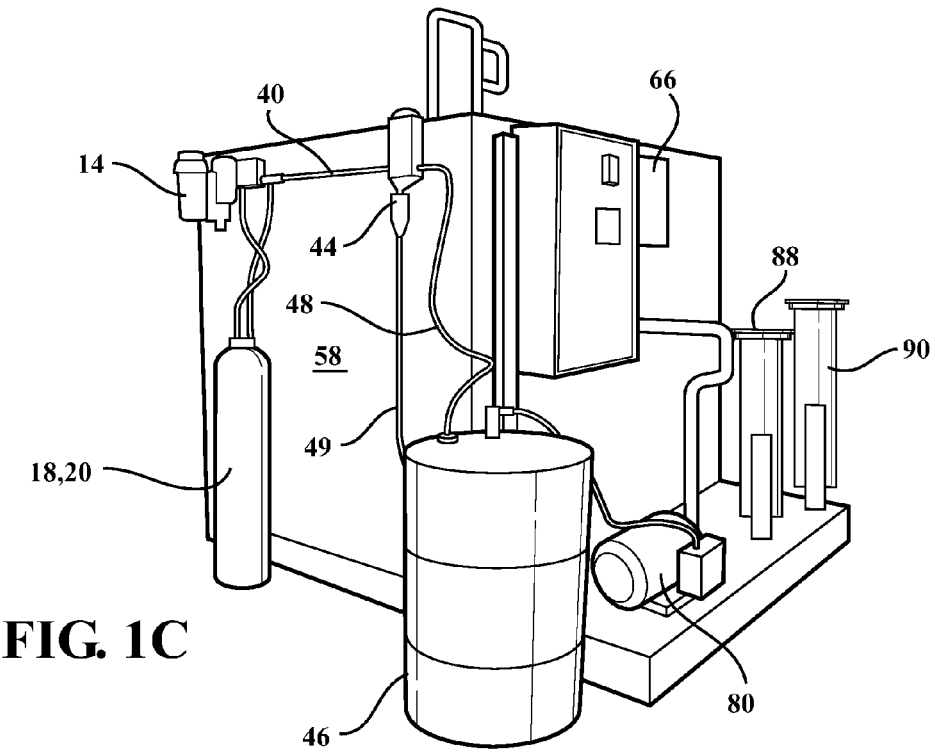
FIGS. 1C-1E are first, second and third rotated views of the main CMM body depicted in schematic in FIG. 1A and illustrating various components described.
Figure 1D:
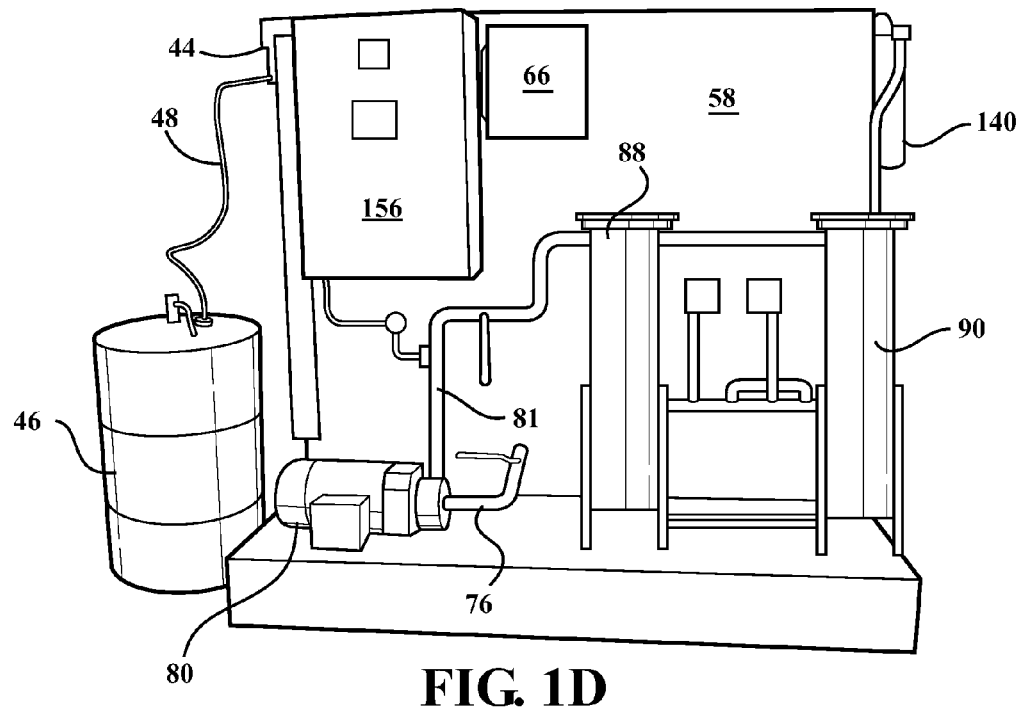
Figure 1E:
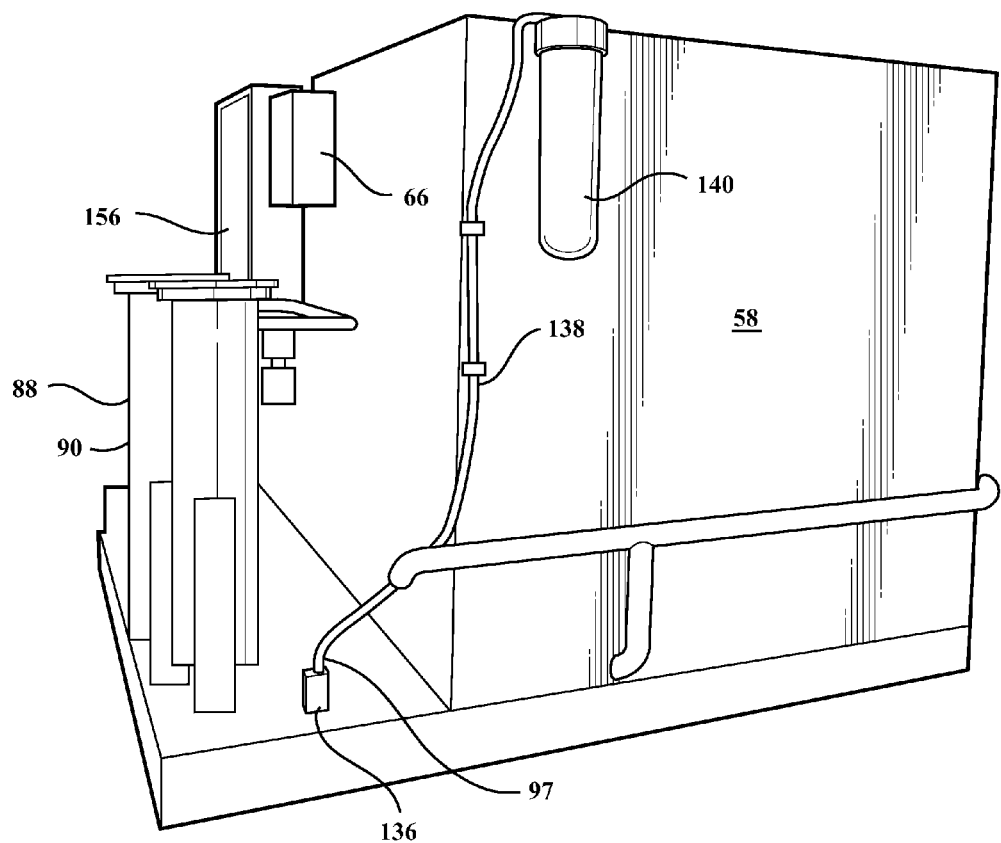

FIGS. 1C, 1D and 1E illustrate a succession of views based on the CMM main body 58 described in schematic in FIG. 1A and depict a generally three dimensional and pseudo rectangular shaped main holding reservoir and upon which a number of the components described in detail in FIG. 1A are referenced. For purposes of ease of illustration, only representative components are shown and it is further understood that an appropriate conduit network such as is represented by outlet 4 and return 6 lines are communicated to the CMM system.

With reference to succeeding screen shot illustrations FIGS. 2-8, an associated processor control is described for operating the various parameters of the CMM system previously described, these being accessed from and operable through a panel mounted processor 156 (see FIG. 1D) which is wired into various of the components of the CMM system and as will be hereinafter described.

Figure 2:
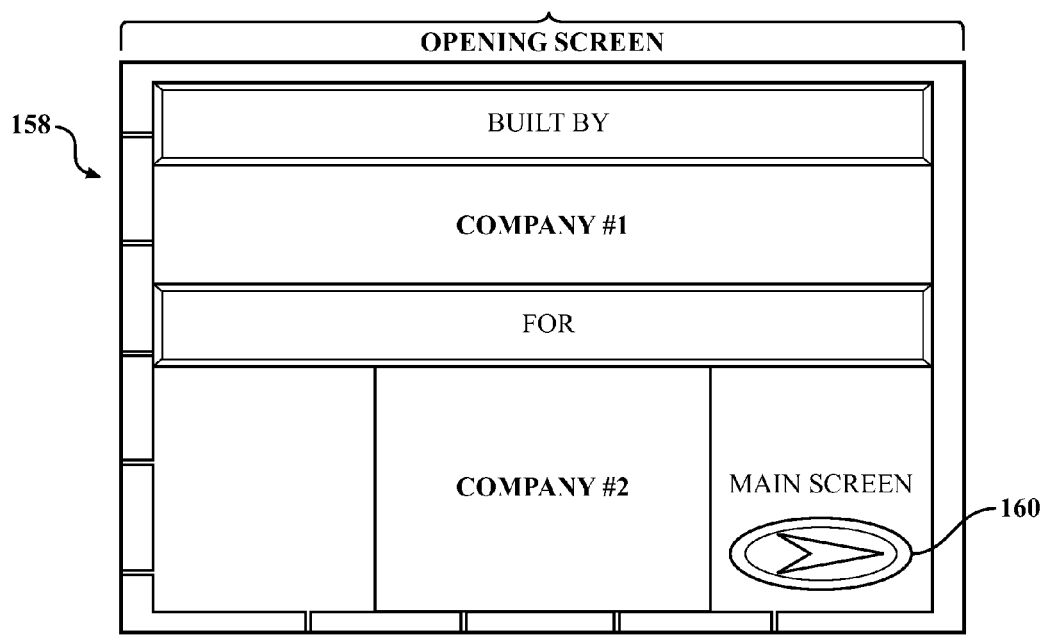
FIG. 2 is a first screen illustration of an associated process control program for operating the CMM system.
Figure 3:
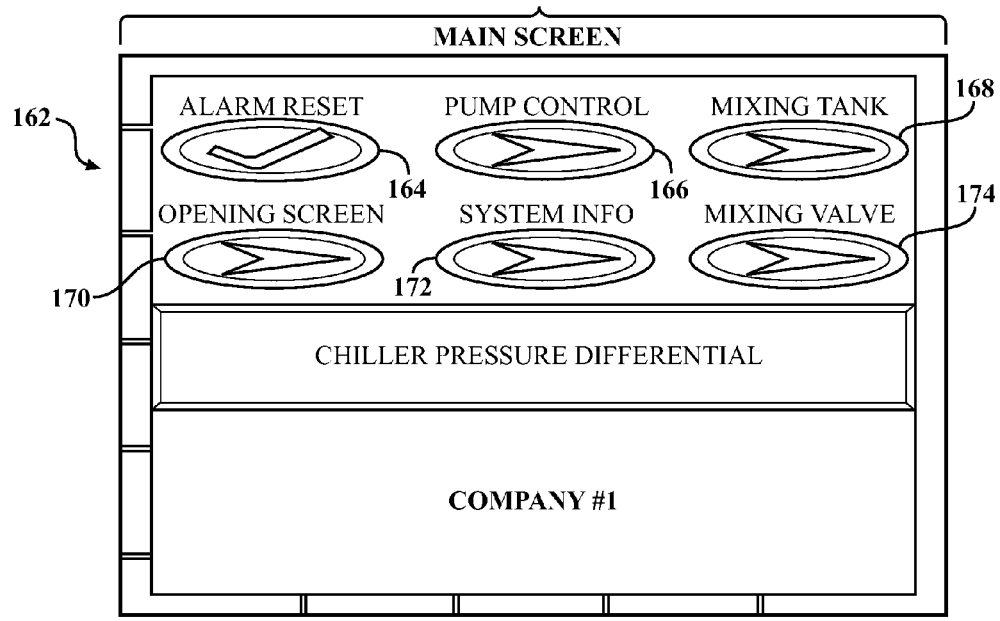
FIG. 3 is a succeeding main jump off screen illustration for providing access to all remaining screens.

With reference first to FIG. 2, a first screen illustration 158 is illustrated of the associated process control program for operating the CMM system and in which, when power is first applied to the system, a main screen button 160 (typically of a capacitive touch screen variety in the non-limiting variant depicted) located in a lower right hand corner can be accessed to advance to a succeeding screen;

FIG. 3 is a succeeding main jump off screen 162, accessed from the main button 160 in FIG. 2, and which provides access to all remaining screens. This includes a series of additional buttons including alarm reset 164, pump control 166, mixing tank 168, return to opening screen 170, system information access 172 and mixing valve 174. For normal operation, all this is needed to start the unit is to press pump control 166 (see also 80 in FIG. 1A) and proceed to the next succeeding screen illustration (FIG. 4).

Figure 4:
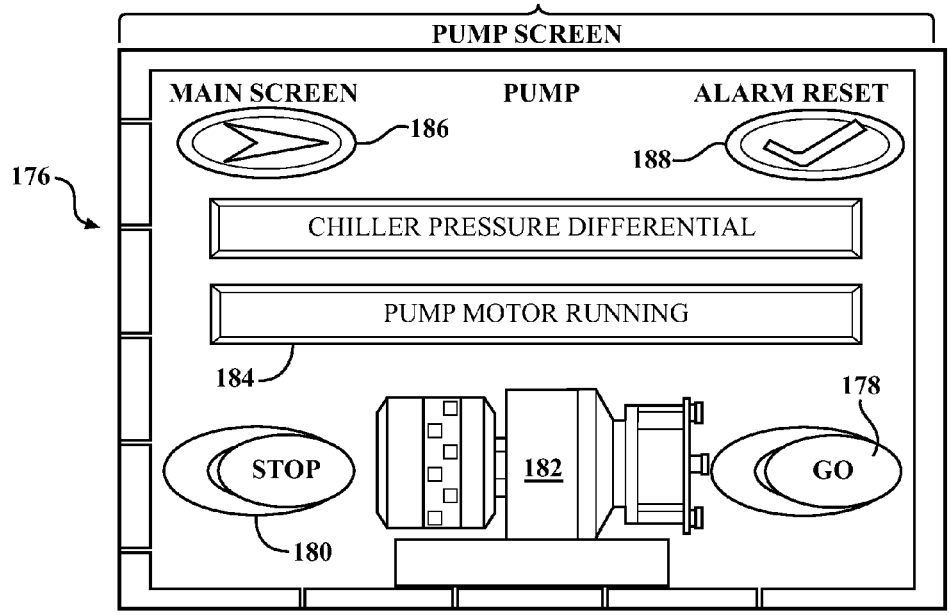
FIG. 4 is a pump section screen for controlling on/off function of a main fluid pump located at an outlet of the CMM reservoir.

FIG. 4 is a pump section screen 176 for controlling on/off function (see on button 178 and off button 180) of the main fluid pump 80 located at outlet 76 of the CMM reservoir 58. When the on button 178 is depressed, an associated pump icon 182 will illuminate in a first color (e.g. green) and will also display a banner such as entitled "pump motor running". Additional buttons are included at 186 for return to main screen 162 and for alarm reset 188.

Figure 5:
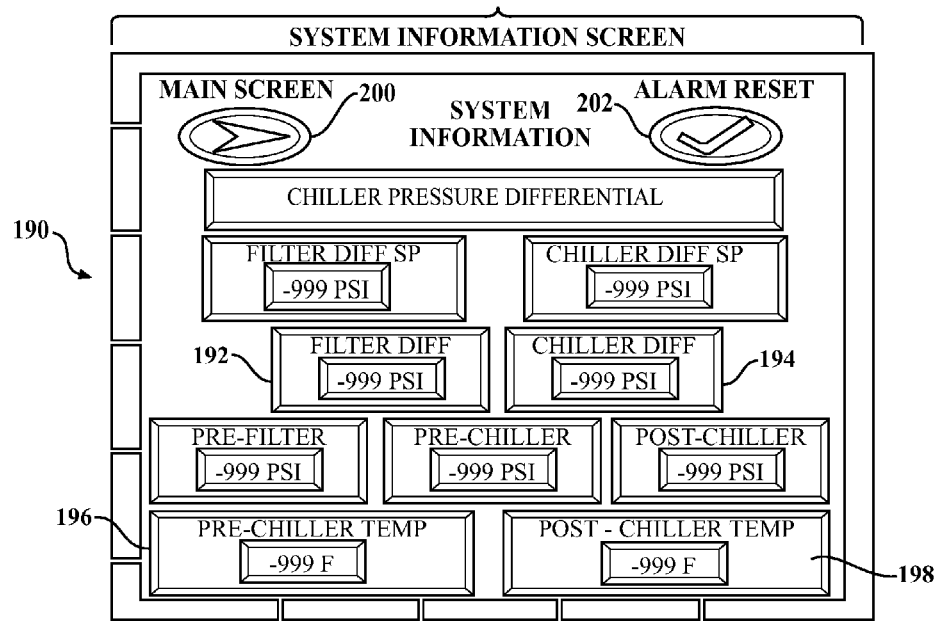
FIG. 5 is a system information screen for taking readings from electrical temperature and pressure switches in operable communication with a site gauge associated with the CMM fluid reservoir and which additionally displays filter status and controls chiller settings along with coolant running pressure (at calibrated depth and for determining an actual height of the coolant water table within the reservoir) and temperature.

FIG. 5 is a system information screen 190 for taking readings from the electrical temperature 62 and pressure 60 switches in operable communication with the site gauge 64 associated with the CMM fluid reservoir 56 and which additionally displays both filter status and chiller settings (see representatively identified filter and chiller differential readouts 192 and 194). along with coolant running pressure (at calibrated depth and for determining an actual height of the coolant water table within the reservoir) and temperature. Additional pre 196 and post 198 chiller temperature readouts are indicated along with main screen return button 200 and alarm reset button 202.

Referring now to FIG. 6, a mixing tank status and adjustment screen 204 is presented for determining a proper fill level of the CMM reservoir 56. The screen 204 displays the current status of the mixing tank with normal low/high set points from transducer signal, as well as providing both emergency low 206 and high 208 notifications (these corresponding to mechanical low 74 and high 72 float switches. In this manner, an operator can adjust a working range of the tank by setting fill start and stop points, these relative to the fixed nature of the E-Low 206 and E-high 208 mechanical float switch notification settings which cannot be changed and which override the electronic settings if there is any conflict with each other. Main screen return and alarm reset touch buttons 210 and 212, respectively, are again provided. Additional functionality includes determining at least one of water temperature and actual height of the coolant water table within the reservoir.

Proceeding to FIG. 7, a mixing valve screen is generally shown at 214 for controlling the operation of the three way feed water controller valve 24 in which the first and second inlets recombine a volume of an untreated inlet city water with a determined subset volume of pre de-ionized water, this admixture again outputted to common line 40 for subsequent admixture with an oil (see adjustable coolant concentrate mixing pump 44 with line 48 extending to chemical concentrate 46). Screen 214 further enables the user to change the set points for the mixing valve 24 based upon a desired parts per million (ppm) setting which is desired for the recombined water sent to the adjustable coolant concentrate mixing pump, the status of which can be reflected upon a pump icon shown at 216 (e.g. red to green for in or out of range status). Main return screen 218 and alarm reset 220 buttons are again provided.

Figure 8:
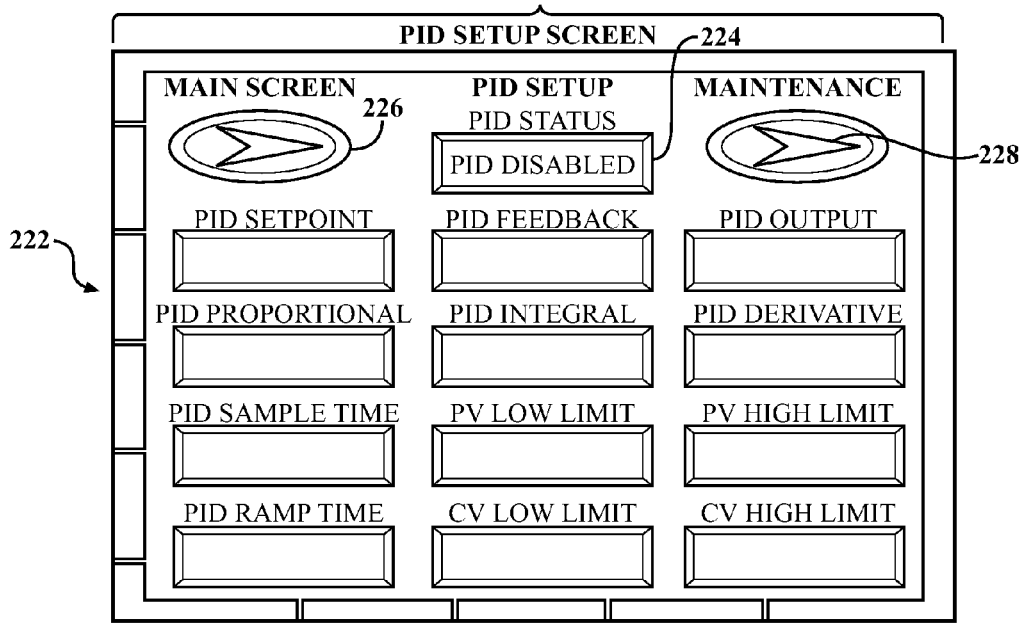
FIG. 8 is an optional manual adjustment screen, such as which can be accessed from the system information screen of FIG. 5, and in which an operator can modify various set points outside of the factory pre-settings.

FIG. 8 is an optional manual adjustment screen 222, such as which can be accessed from the system information screen of FIG. 5, and in which an operator can modify various set points outside of the factory pre-settings, and such as concerning the status of the main CMM reservoir 56. These include PID disabled readout 224, such as when the auto fill valve 52 is not supplying coolant to the sump which protects the PID from spooling commands, as well as providing main screen access 226 and maintenance access 228 buttons.

Figure 9:
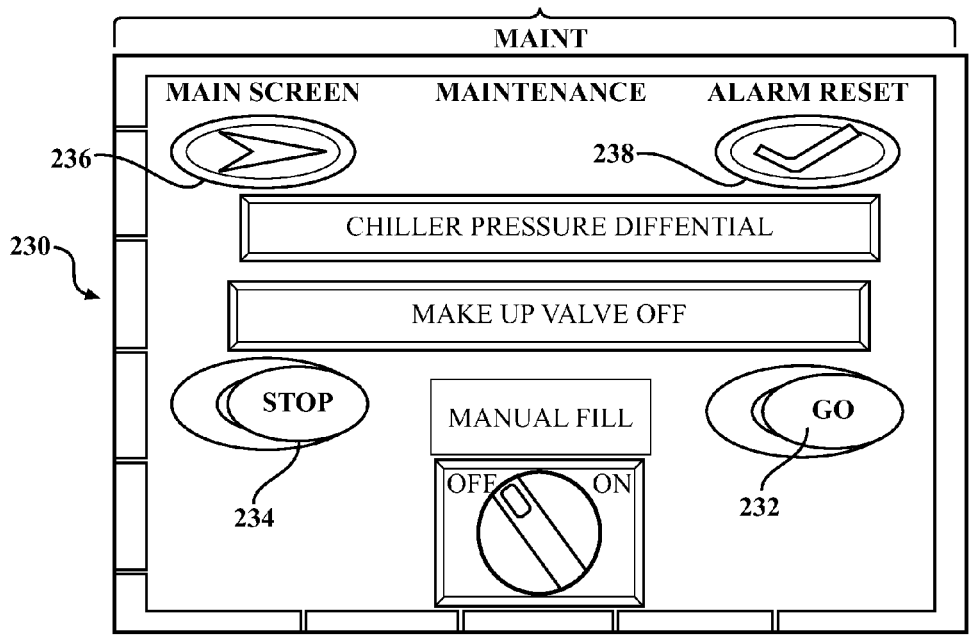
FIG. 9 is a maintenance/manual override screen for optionally turning off and on the mixing pump for filling the CMM reservoir, as well as allowing the operator to enter adjustments to PID set points associated with the adjustment screen of FIG. 8.

FIG. 9 is a maintenance/manual override screen 230 for optionally turning off and on the mixing pump (via bypass valve 54) utilizing go 232 and stop buttons 234 for filling the CMM reservoir 56, as well as allowing the operator to enter adjustments to PID set points associated with the adjustment screen of FIG. 8. Main screen return 236 and alarm reset 238 buttons are again provided.

Figure 10:
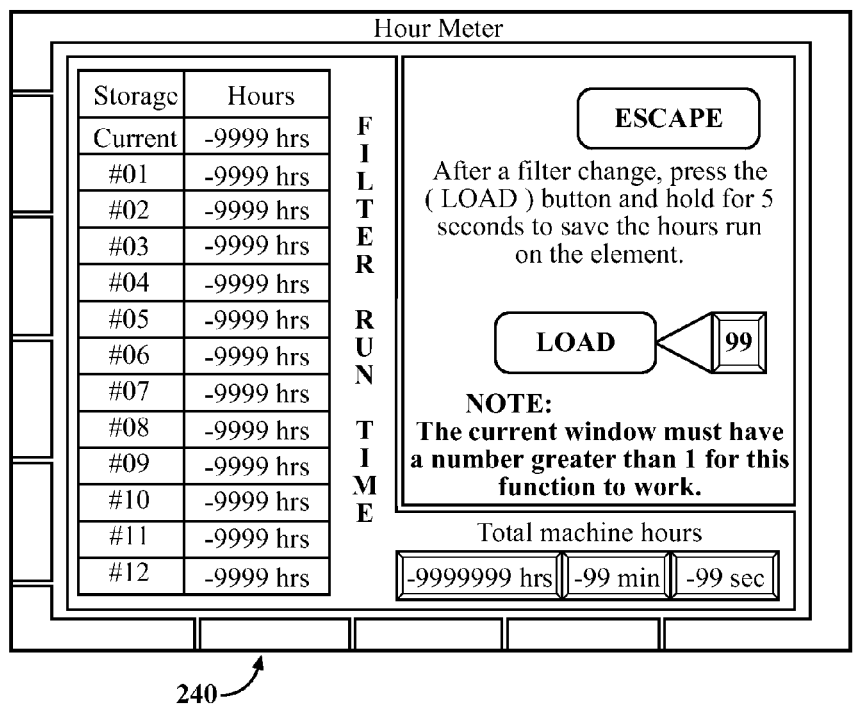
FIG. 10 is an hour meter screen for displaying a total number of hours a machine has run as well as maintaining a record filter changes including identification of a FIFO (first in/first out) stack identifying a previous last twelve changes.

FIG. 10 illustrates at 240 an hour meter screen for displaying a total number of hours a machine has run as well as maintaining a record filter changes including identification of a FIFO (first in/first out) stack identifying a previous last twelve changes. A bank of twelve DI bottles (also termed filters) are listed along with a number of run time hours associated with each. Instructions included with the screen notify the operator to depress LOAD button following filter change and in order to save a number of hours run on the element.

Figure 11:
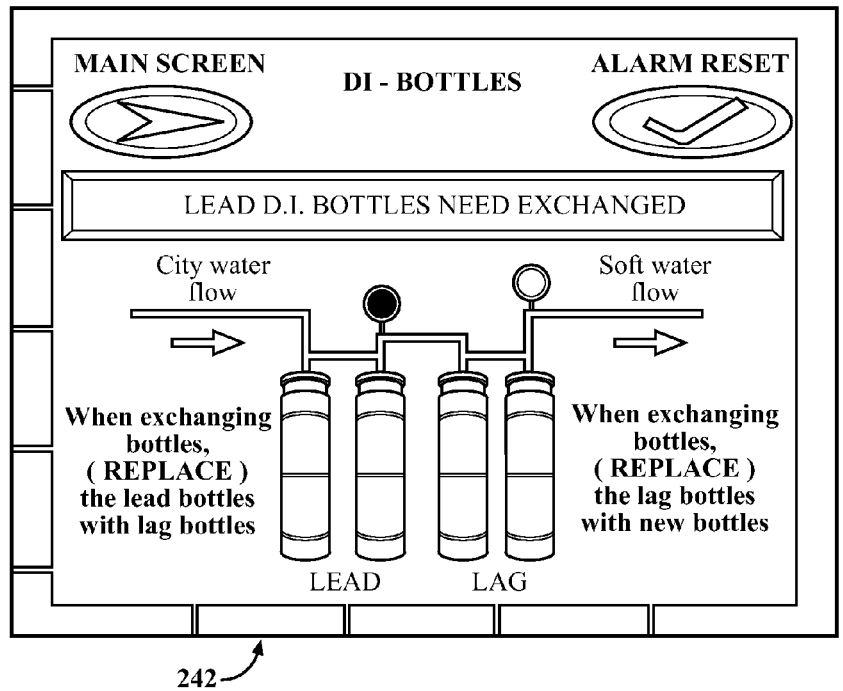
FIG. 11 is a deionization (DI) bottle screen for displaying a status of the DI bottles as well as instructing an operator when it is time to swap or replace the bottles.

FIG. 11 illustrates at 242 a deionization (DI) bottle screen for displaying a status of the DI bottles as well as instructing an operator when it is time to swap or replace the bottles. As with FIG. 10, a bank of twelve filters are identified along with instructions regarding DI exchange for setting and decrementing down one position a stored number associated with a number of gallons of water processed through each bottle within the bank.

Figure 12:
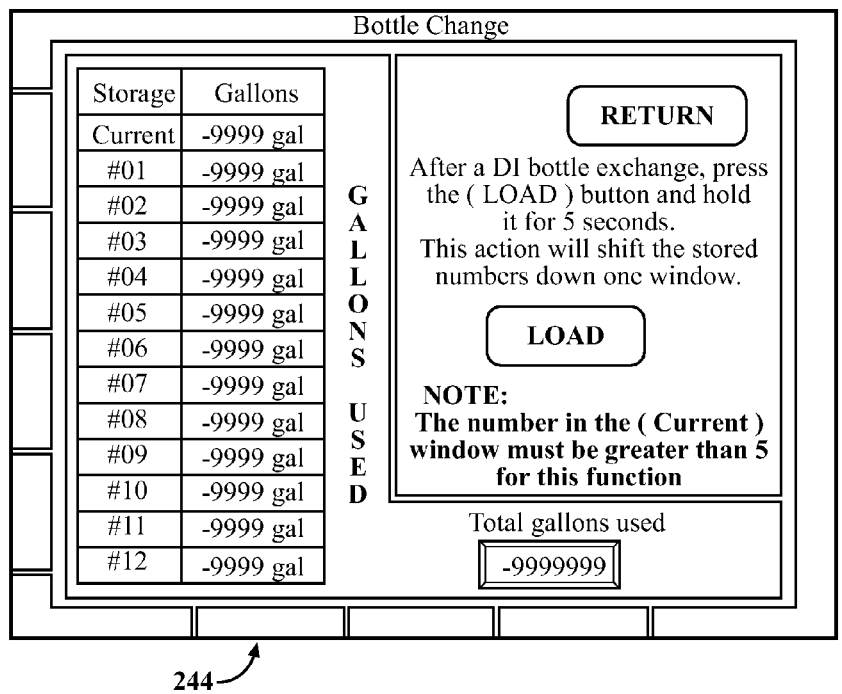
FIG. 12 is a succeeding bottle change screen for allowing the operator to keep track of how many total gallons of water have been processed through the system and which also displays a number of gallons that have been run through a bank of bottles prior to changing such as a twelve bottle stack.

Finally, FIG. 12 identifies at 244 a succeeding bottle change screen for allowing the operator to keep track of how many total gallons of water have been processed through the DI lead and lag bottles and which also displays a number of gallons that have been run through a bank of bottles prior to changing such as a twelve bottle stack.

In this manner, the continuous re-circulatory and makeup/replenishment aspects of the system combine to ensure long term stability of the coolant supply combined with maintaining a proper oil to water recipe mixture (e.g. 6-12% oil for 94-88% water), this again in order to maintain desired emulsification properties during coolant operation at the individual filtration systems 2. In one further non-limiting example, each associated sump reservoir incorporated into a given machine located filtration system 2 can turn over substantially its entire volume every hour through continuously outflow to and resupply from the main CMM reservoir and which is again returned as a clean coolant with appropriate mixture of oil to treated and conditioned water. Additionally, losses at each individual filtration system reservoir can be reflected by movement within the main CMM reservoir (typically a couple of inches in overall column height 64).

An associated process for producing and supplying a coolant to at least one filtration sub-system, as well as reconditioning and recombining a return flow of used coolant, is also disclosed and, most broadly, includes the steps of receiving an inlet flow of untreated water, de-ionizing a subset volume of said water and recombining the untreated and de-ionized portions within a three way valve and outputting the re-combined water to a mixing pump and intermixing with a chemical concentrate to produce the coolant. Additional steps include feeding the coolant into a main reservoir and successively drawing sub-volumes of coolant through an outlet to a particle filter for filtering out solids, chilling a filtered output to adjust a temperature of the coolant, and conveying an clean coolant from an outlet of the chiller to the filtration subsystem.

Other steps include returning a dirty water stream from the filtration subsystem for delivery a re-introduction location within the body including waste oil skimming and a coalescent filtering for removing residual oil as well as conveying reconditioned fluid from the coalescent filter through a fluid column to a reintroduction location of the main reservoir and resupplying reconditioned coolant for recirculation to the filtration subsystems.

Other steps include introducing ozone or air particles within a submerged location of the main reservoir for biologically treating the coolant and returning a subset volume of clean coolant from an outlet of the particle filter to a submerged floor location of the main reservoir as a laminar agitated flow of clean coolant for preventing residual solids within the reservoir from settling and to maintain a constant thermal gradient along the substantial depth of the reservoir.

Additional steps include pumping a volume of a substantially untreated fluid through a filter and into the re-introduction location associated with the main body to assist in foam removal and recirculation of return coolant through the coalescent filter and for determining the main tank fluid level via the sight tube accessible pressure transducer as previously described.

The present invention also discloses a computer writeable medium incorporating a processor control associated with a system for producing and supplying a coolant to at least one filtration subsystem as well as reconditioning and recombining a return flow of used coolant. The medium, again most broadly recited, includes a first subroutine for de-ionizing a subset volume of an untreated inlet water and for recombining untreated and de-ionized sub-volumes within a three way valve, a second subroutine for outputting the re-combined water to a mixing pump and intermixing with a chemical concentrate to produce a coolant exhibiting a specific water to chemical recipe, and a third subroutine for drawing a volume of coolant pre-deposited in a reservoir for successive particle filtering of solids and chilling to adjust a temperature of the coolant prior to communicating to the filtration subsystems.

Additional subroutines include those for re-introducing a dirty return coolant and for oil skimming and coalescent filtering for removing residual oil, as well as for re-conveying reconditioned fluid from the coalescent filter through a fluid column to a reintroduction location of the main reservoir and resupplying reconditioned coolant for recirculation to the filtration subsystems.

Yet additional subroutines associated with the computer writeable medium can include, without limitation in reference to the cumulative preceding disclosure, introducing ozone or air particles within a submerged location of the main reservoir for biologically treating the coolant and returning subset volumes of clean coolant from an outlet of the particle filter to a submerged floor location of the main reservoir as a laminar agitated flow of clean coolant for preventing residual solids within the reservoir from settling and to maintain a constant thermal gradient along the substantial depth of the reservoir. Additional subroutines can include redirecting an overflow of clean coolant from an outlet location of the chiller back to the main reservoir which exceeds a downstream demand represented by a total number of filtration subsystems in operation.

Other additional subroutines drawn from the above disclosure include pumping a volume of a substantially untreated fluid through a filter and into the re-introduction location associated with the main body to assist in foam removal and recirculation of return coolant through the coalescent filter and sampling a fluid pressure from a site gauge associated with the main reservoir in order to trip either of high and low float mechanical switches submerged within the main reservoir for activating a feed valve for supplying coolant to the reservoir. Finally, other subroutines can include varying an additive component of chemical concentrate added to replenishment volumes of coolant in order to maintain an overall recipe mixture of chemical to water components when introduced into the main reservoir, and again thereby avoid an undesirable oil-rich sump composition.

Having described our invention, other and additional preferred embodiments will become apparent to those skilled in the art to which it pertains, and without deviating from the scope of the appended claims.

I claim:

1. A system for producing and supplying a coolant to at least one filtration subsystem as well as reconditioning and recombining a return flow of used coolant, said system comprising:
    a body incorporating a main reservoir in two way communication with the filtration sub-system via an outlet clean coolant carrying conduit and a dirty return coolant carrying conduit;
    an inlet conduit including a branching location for feeding a portion of an untreated water supply to a de-ionization canister;
    a mixing valve in communication with said inlet conduit and recombining a remaining untreated sub-volume of the water supply with the de-ionized sub-volume according to at least one variable programmed into a processor associated with said system;
    a mixing pump in fluidic communication with an outlet of said mixing valve and intermixing the recombined water supply with a chemical concentrate;
    an inlet feed valve in communication with an outlet of said mixing pump and, upon actuation of said inlet feed valve, said main reservoir receiving a volume of coolant to a fill level established by high and low parameters;
    a main pump drawing a volume of coolant through an outlet extending from said reservoir and communicating said coolant to a particle filter;
    a chiller located downstream from said particular filter for adjusting a temperature of the coolant, an outlet of said chiller communicating with the outlet clean coolant carrying conduit;
    the return coolant carrying conduit delivering the dirty coolant to a re-introduction location of said body and which includes a waste oil skimmer and a coalescent filter for removing residual oil from the dirty coolant; and
    a fluid column communicating said coalescent filter with a reintroduction location of said main reservoir for resupplying reconditioned coolant for recirculation to the filtration subsystems.

2. The system as described in claim 1, further comprising at least one of an ozone generator or air pump and controller for introducing a plurality of ozone or air particles within a submerged location of said main reservoir.

3. The system as described in claim 1, further comprising a first branch line extending from an outlet of said particle filter prior to said chiller and returning a subset volume of clean coolant to said main reservoir via a series of nozzles arranged proximate a submerged floor of said reservoir and which serves to introduce a laminar agitated flow of clean coolant for preventing residual solids within said reservoir from settling and to maintain a constant thermal gradient along the substantial depth of said reservoir.

4. The system as described in claim 3, further comprising an overflow line extending from an outlet location of said chiller for redirect back to said main reservoir a determined volume of clean coolant outflow determined to exceed a downstream demand represented by a total number of filtration subsystems in operation.

5. The system as described in claim 1, further comprising a dirty fluid outlet from said particle filter communicating to a drain.

6. The system as described in claim 5, further comprising a sump located within said drain and pushing a volume of dirty fluid through a filter and into said main reservoir.

7. The system as described in claim 4, wherein said processor associated with said system controls at least one additional operational parameter, said parameter selected from the group consisting of said coolant concentrate mixing pump, inlet feed valve ozone generator, air pump, main pump, chiller, said first branch line and said second overflow line.

8. The system as described in claim 1, further comprising a pressure transducer in communication with said main reservoir for converting an input pressure reading to an output signal calibrated to determine the fluid level within the main reservoir.

9. The system as described in claim 8, further comprising a manual bypass valve in parallel with said inlet feed valve.

10. The system as described in claim 1, said particle filter further comprising a pair of sentinel filters mounted in parallel, pressure switches being mounted with common inlet and outlet lines associated with said filters and instructing filter removal upon reaching a set variable.

11. The system as described in claim 8, further comprising pressure and temperature switches in communication with said main reservoir and, along with said pressure transducer, interfacing with an associated controller program for determining preset emergency high and low fluid levels.

\* \* \* \* \*